(12) United States Patent
Hirai et al.

(10) Patent No.: US 8,427,488 B2
(45) Date of Patent: Apr. 23, 2013

(54) PARALLAX IMAGE GENERATING APPARATUS

(75) Inventors: Ryusuke Hirai, Tokyo (JP); Hidenori Takeshima, Ebina (JP); Takeshi Mita, Yokohama (JP); Nao Mishima, Inagi (JP); Kenichi Shimoyama, Tokyo (JP); Takashi Ida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/409,213

(22) Filed: Mar. 1, 2012

(65) Prior Publication Data

US 2012/0162223 A1    Jun. 28, 2012

Related U.S. Application Data

(63) Continuation of application No. PCT/JP2009/066432, filed on Sep. 18, 2009.

(51) Int. Cl.
*G06T 1/20* (2006.01)
*G06K 9/54* (2006.01)
*G06K 9/60* (2006.01)

(52) U.S. Cl.
USPC .......................................... 345/506; 382/303

(58) Field of Classification Search ...................... None
See application file for complete search history.

(56) References Cited

U.S. PATENT DOCUMENTS

2003/0026474 A1    2/2003  Yano
2006/0050383 A1    3/2006  Takemoto et al.
2011/0157229 A1*   6/2011  Ni et al. .................. 345/646

FOREIGN PATENT DOCUMENTS

JP    2003-47027 A    2/2003
JP    2004-295859 A   10/2004
JP    2007-53621 A1    3/2007
WO    2004/071102 A1   8/2004

OTHER PUBLICATIONS

K-J Oh, et al., Hole-Filling Method Using Depth Based In-Painting for View Synthesis in Free Viewpoint Television (FTV) and 3D Video, Mitsubishi Electric Research Laboratories TR2009-025, Jun. 2009.*
International Search Report mailed Oct. 27, 2009, in International Application No. PCT/JP2009/066432 filed Sep. 18, 2009 (with English translation).
International Written Opinion mailed Oct. 27, 2009, in International Application No. PCT/JP2009/066432 filed Sep. 18, 2009.
Criminasi, Antonio, Patrick Perez and Kentaro Toyama, "Region Filling and Object Removal by Exemplar-Based Image Inpainting," IEEE Transactions on Image Processing, vol. 13, No. 9, Sep. 2004.

* cited by examiner

*Primary Examiner* — Kee M Tung
*Assistant Examiner* — Haixia Du
(74) *Attorney, Agent, or Firm* — Oblon, Spivak, McClelland, Maier & Neustadt, L.L.P.

(57) ABSTRACT

According to one embodiment, a parallax image generating apparatus includes a deriving unit, a generating unit, a first calculating unit, a setting unit, a searching unit, and an interpolating unit. The deriving unit derives a parallax vector corresponding to a first pixel from the input image and depth information associated with the first pixel. The generating unit generates an intermediate image. The first calculating unit calculates first weights for respective pixels of a parallax image. The setting unit sets one or more candidate blocks near a shade-forming-area pixel of the intermediate image, and sets a reference block among one or more candidate blocks. The searching unit searches a target block similar to the reference block in the input image and/or the intermediate image. The interpolating unit interpolates a pixel value of the shade-forming-area pixel.

5 Claims, 10 Drawing Sheets

PARALLAX IMAGE GENERATING APPARATUS

CROSS-REFERENCE TO RELATED APPLICATIONS

This application is a Continuation Application of PCT Application No. PCT/JP2009/066432, filed Sep. 18, 2009, the entire contents of which are incorporated herein by reference.

FIELD

Embodiments described herein relate generally to a parallax image generating apparatus.

BACKGROUND

Various methods have been proposed in which a parallax image corresponding to an input two-dimensional image is generated to enable three-dimensional display. The parallax image is generated by obtaining a parallax vector per pixel from an input image and the depth information thereof, and assigning the pixel values of the pixels of the input image to the positions indicated by the resultant parallax vectors. During generation of the parallax image, a blank area (shade forming area), to which no pixel values are assigned, may well occur. JP-A 2004-295859 (KOKAI) discloses a three-dimensional image generating apparatus, in which pixel values assigned to the pixels of the blank area are generated for interpolation based on pixel values corresponding to the end portions of the image components adjacent to the blank area. Further, a non-patent document—Antonio Criminasi, Patrick Perez and Kentaro Toyama, "Region Filling and Object Removal by Exemplar-Based Image Inpainting," IEEE Trans. Image Processing, Vol. 13, No. 9, September 2004—discloses an image inpainting technique used for, for example, image repairing. In this technique, the pixel values of a blank area in an image are interpolated using pixels in the boundary between the blank area and a non-blank area adjacent thereto. In this pixel interpolation, interpolation may be performed on the blank area, based on the pixel values of an area indicating, for example, an object near a photographer, even when the blank area is a background.

In the above-mentioned conventional pixel interpolation, unnatural images may well be generated as a result of interpolation of the pixel values of a blank area based on the pixel values of a foreground.

DETAILED DESCRIPTION

In general, according to one embodiment, a parallax image generating apparatus includes a deriving unit, a generating unit, a first calculating unit, a setting unit, a searching unit, and an interpolating unit. The deriving unit derives a parallax vector corresponding to a first pixel from the input image and depth information associated with the first pixel. The generating unit generates an intermediate image. The first calculating unit calculates first weights for respective pixels of a parallax image. The setting unit sets one or more candidate blocks near a shade-forming-area pixel of the intermediate image, and sets a reference block among one or more candidate blocks. The searching unit searches a target block similar to the reference block in the input image and/or the intermediate image. The interpolating unit interpolates a pixel value of the shade-forming-area pixel.

According to an embodiment, there is provided a parallax image generating apparatus which interpolates the pixel values of a shade forming area, based on first weights set such that the pixels have greater weights as they are closer to the background of an input image, thereby generating a more natural parallax image.

Referring to the accompanying drawings, parallax image generating apparatuses according to embodiments will be described in detail.

The embodiments provide a parallax image generating apparatus that generates a more natural parallax image by interpolating the pixel values of a shade forming area using those of a background image.

In each of the parallax image generating apparatuses of the embodiments, assume that an input image input to each parallax image generating apparatus is used as an image for the left eye, and a parallax image for the right eye is generated from the input image. However, the input image is not limited to the image for the left eye. Alternatively, the input image may be used as an image for the right eye. In this case, an image for the left eye is generated by inverting the direction of the vector used.

Firstly, for facilitating the description below, a method of displaying, using a vector, the position of each pixel forming an image, such as an input image (an image for the left eye) and a parallax image (an image for the right eye), will be described.

Figure 1:
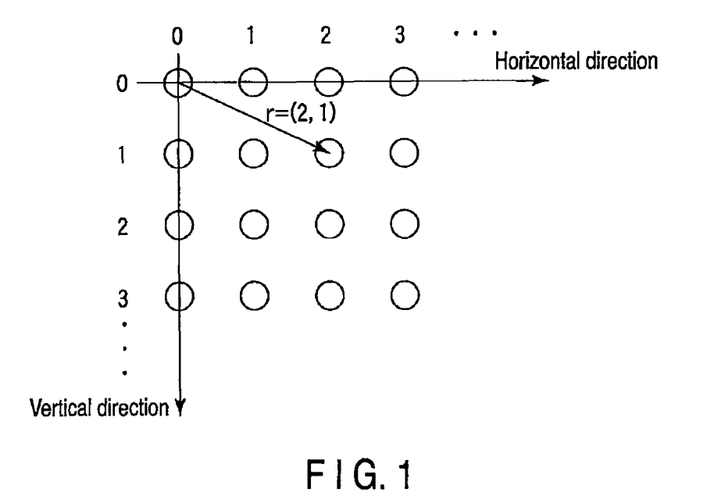
FIG. 1 is a schematic view illustrating the positional relationship among two orthogonal coordinate axes and pixels providing an image.

FIG. 1 is a schematic view illustrating the positional relationship among two orthogonal coordinate axes and pixels providing an image. In FIG. 1, the orthogonal axes are the horizontal and vertical axes, and the pixels are indicated by circles. Assume here that the center position of each pixel is denoted by horizontal- and vertical-axis integer coordinates. In the following description, all vectors start from (0, 0), unless otherwise noted. As shown in FIG. 1, if a pixel has a horizontal-axis coordinate of 2 and a vertical-axis coordinate of 1, it is denoted by position vector r=(2, 1).

Figure 2:
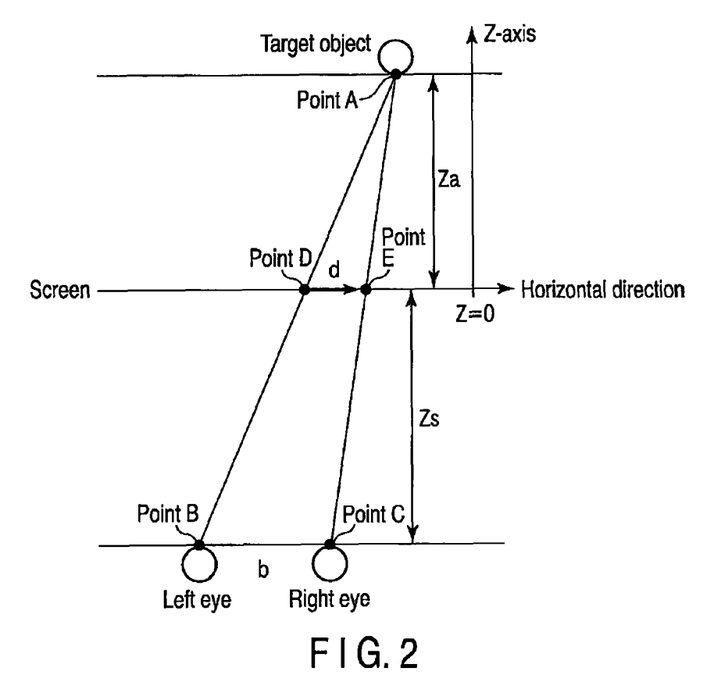
FIG. 2 is a view illustrating the relationship between depth information and parallax vectors.

Referring now to FIG. 2, a description will be given of an equation for deriving a parallax vector. In FIG. 2, a target object positioned at point A is projected on a screen. This screen is provided in parallel with the horizontal axis of FIG. 1. FIG. 2 is a view obtained by seeing an audio-visual environment from overhead. In the upper portion of FIG. 2 above the line indicating the screen, a target having a depth of Za is virtually positioned in the audio-visual environment. Points B and C indicate the left and right eyes of an audience, respectively. Further, line segment BC is horizontal and parallel to line segment DE. Z-axis is set to be perpendicular to the screen and to start from an origin formed by the intersection of itself and the screen.

Point D indicates the position on the screen, at which point A seen by the left eye is projected. Namely, point D indicates the position of the target on a screen for the left-eye image. Similarly, point E indicates the position on the screen, at which point A seen by the right eye is projected. Namely, point E indicates the position of the target on a screen for the right-eye image. The arrow extending from point D to point E represents parallax vector d. This parallax vector is a first-dimensional vector having only a horizontal component that has a positive value from point D to point E.

Assuming that the distance between the audience and the screen is Zs, (Za+Zs): Za=b: d is established since triangle ABC is similar to triangle ADE. Accordingly, the parallax vector d is defined by the following equation:

$$d = b \frac{Z_a}{Z_a + Z_s}$$

In the following description, the depth (Z-axis directional distance) of the target projected at a pixel position i on an input image is represented by z(i). The depth z(i) represents a relative distance that assumes a value normalized in the range of 0 to 1. "i" represents a two-dimensional vector indicative of a position on a two-dimensional image. Namely, the depth of the target positioned at infinity from the screen is represented by z=1. Further, in the following description, the parallax vector at a pixel position i is represented by d(i).

The depth associated with each pixel of the input image (i.e., the left-eye image) can be held by the input image itself, or be derived therefrom. Further, if the input image is obtained by photographing using, for example, a range finder camera incorporating a distance meter, the depth can be acquired by measuring the distance to a subject using the distance meter. The parallax image generating apparatuses according to the embodiments receive an input image and depth information corresponding thereto.

(First Embodiment)

Figure 3:
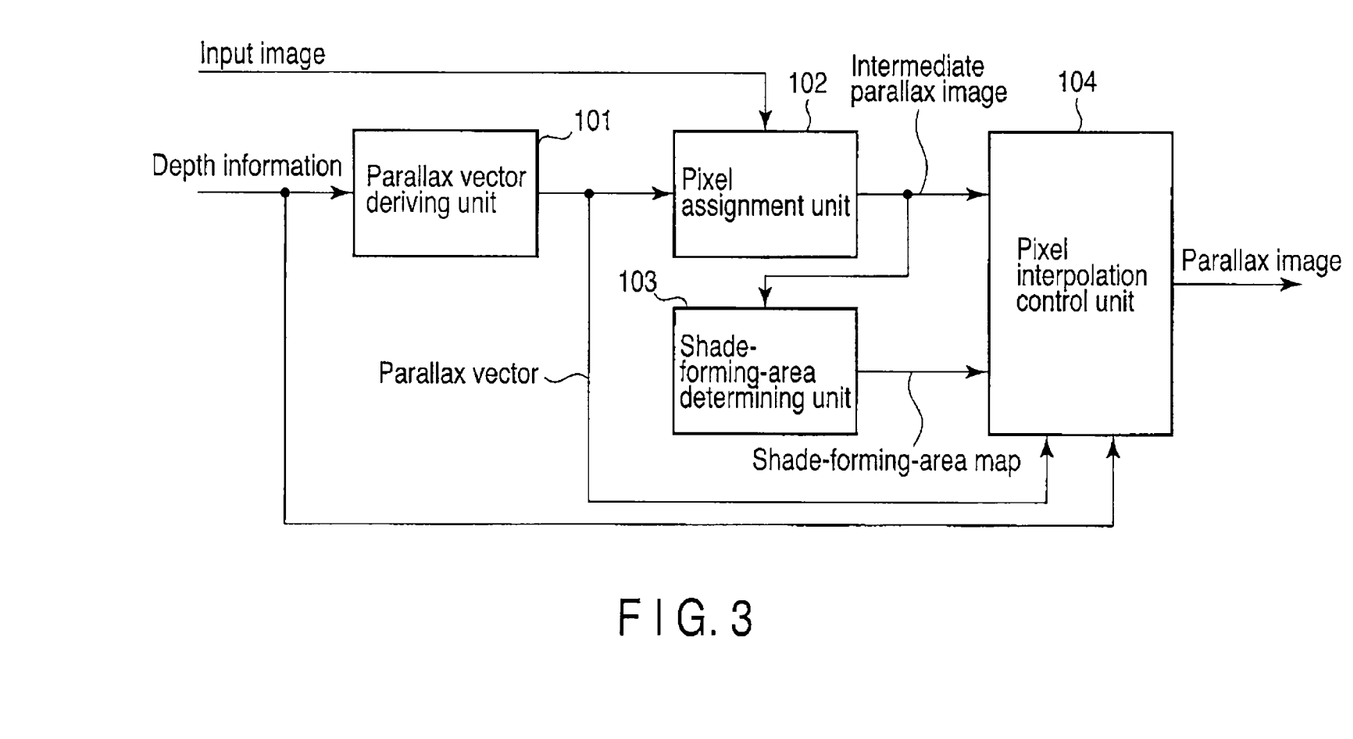
FIG. 3 is a block diagram illustrating a parallax image generating apparatus according to a first embodiment.

FIG. 3 is a block diagram illustrating a parallax image generating apparatus according to a first embodiment. This parallax image generating apparatus includes a parallax vector deriving unit 101, a pixel assignment unit 102, a shade-forming-area determining unit 103 and a pixel interpolation control unit 104. The parallax image generating apparatus receives an input image and depth information corresponding thereto. The parallax image generating apparatus is realized by a computer system using, for example, a personal computer. The computer system includes a CPU, a program memory and a work memory, which are not shown. Each block shown in FIGS. 3 and 4 functions when the CPU operates in accordance with the program stored in a program memory. The input image and its depth information are read by the CPU from a storing medium contained in or connected to the computer system. Alternatively, the input image may be input via a network. Yet alternatively, the computer system may incorporate a unit for generating depth information from the input image. If, for instance, a built-in computer system is installed in a display apparatus, the input image and the generated parallax image can be displayed by the display apparatus.

The parallax vector deriving unit 101 derives, from the input depth information, parallax vectors corresponding to respective pixels, using the above-mentioned parallax vector deriving equation. In the deriving equation, preset values may be set as the distance Zs between the audience and the screen and the distance b between the eyes of the audience. The derived parallax vector values are output to the pixel assignment unit 102 and the pixel interpolation control unit 104.

The pixel assignment unit 102 receives the input image, and the parallax vectors corresponding to the pixels and sent from the parallax vector deriving unit 101. The pixel assignment unit 102 generates an intermediate parallax image. The intermediate parallax image is generated by assigning the pixel values of the pixels of the input image to the positions indicated by the corresponding parallax vectors. The generated intermediate parallax image is output to the pixel interpolation control unit 104.

In the intermediate parallax image received from the pixel assignment unit 102, the shade-forming-area determining unit 103 determines an area (or areas) in which pixel values are assigned, and an area (or areas) in which pixel values are not assigned. The determination result corresponding to one image (one frame) is stored in a shade-forming-area map. In the shade-forming-area map, if a pixel value is assigned to position vector i in the intermediate parallax image, occlude (i) is set to "occlude=DONE," while if no pixel value is assigned to the position vector i, occlude (i) is set to "occlude=NOT-DONE." The shade-forming-area map storing the determination results is output to the pixel interpolation control unit 104. In the intermediate parallax image, the area, to which no pixel value is assigned, is called a shade forming area. It is strongly possible that the shade forming area corresponds to pixels representing a more distant view.

The pixel interpolation control unit 104 receives the intermediate parallax image from the pixel assignment unit 102, and receives the shade-forming-area map from the shade-forming-area determination unit 103. The pixel interpolation control unit 104 also receives an input image and depth information thereof. The pixel interpolation control unit 104 assigns an interpolation pixel value to each pixel of the shade forming area designated by the shade-forming-area map, to which area pixel values are not yet assigned.

Figure 4:
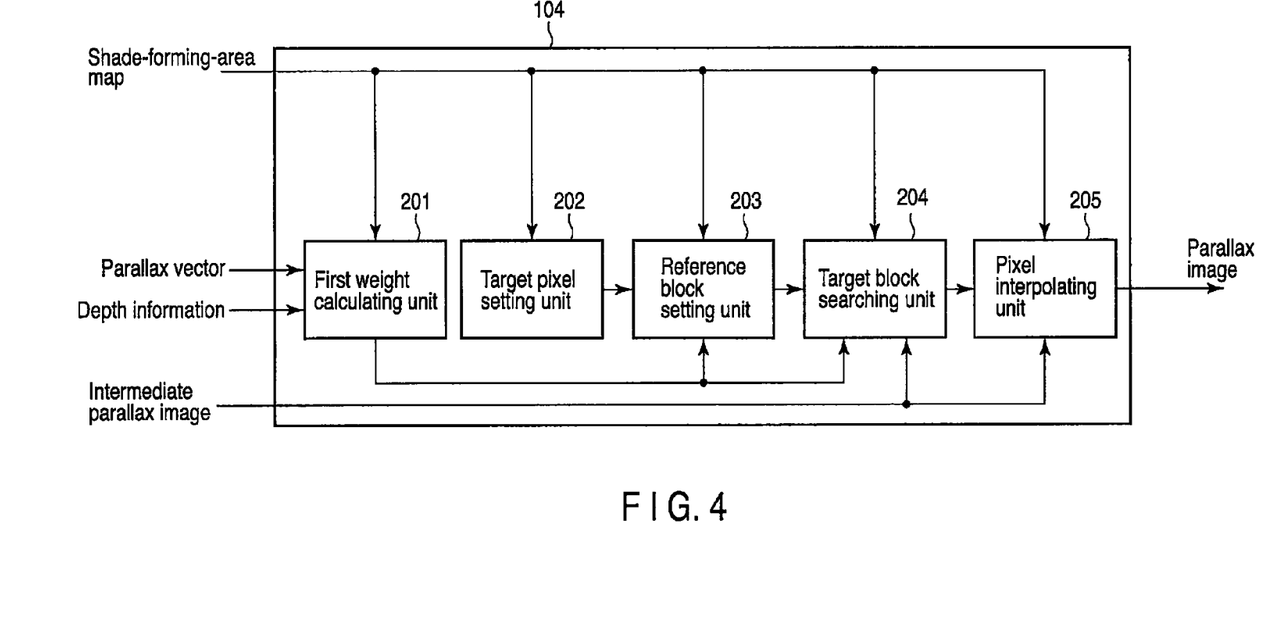
FIG. 4 is a block diagram illustrating, in detail, a pixel interpolation control unit employed in the first embodiment.

Referring then to FIG. 4, the pixel interpolation control unit 104 will be described in detail.

FIG. 4 is a block diagram illustrating in detail the configuration of the pixel interpolation control unit 104 according to the first embodiment. As shown, the pixel interpolation control unit 104 includes a first weight calculating unit 201, a target pixel setting unit 202, a reference block setting unit 203, a target block searching unit 204 and a pixel interpolating unit 205.

Figure 5:
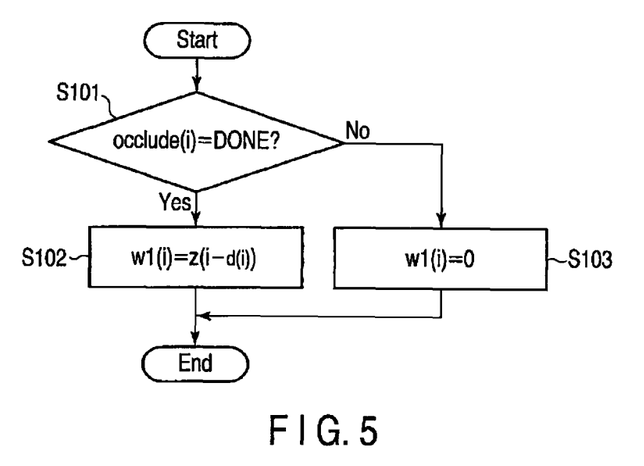
FIG. 5 is a flowchart useful in explaining the weight calculation operation of a first weight calculation unit.

The first weight calculating unit 201 calculates a first weight based on the parallax vector and the depth information. Referring to FIG. 5, a detailed description will now be given of the operation of the first weight calculating unit 201.

FIG. 5 is a flowchart useful in explaining the weight calculating operation of the first weight calculating unit 201. The process shown in the flowchart is performed on the pixel designated by the position vector i in the intermediate parallax image.

The first weight calculating unit 201 refers to the value of occlude (i) in the shade-forming-area map corresponding to the pixel indicated by the position vector i, thereby determining whether a pixel value is assigned to the pixel (i) (step S101).

If it is determined that the pixel value is assigned to the pixel (i) in the intermediate parallax image (YES at step S101), the depth z (i-d(i)) of the pixel included in the input image and corresponding to the pixel (i) is set as a first weight w1(i) (step S102). The subtraction result of the position vector i and the parallax vector d(i) serves as a position vector for the corresponding pixel in the input image. Accordingly, if a pixel value is assigned to the pixel (i) at position i in the intermediate parallax image, it is a pixel value for the pixel included in the input image (i.e., the image for the left eye) and indicated by position i-d(i). Accordingly, the first weight for the pixel (i) at the position i in the intermediate parallax image serves as the depth information for the pixel at the position i-d(i) in the input image.

In contrast, if no pixel value is assigned to the pixel (i) in the intermediate parallax image (NO at step S101), the first value w1(i) at the position i is set to zero (step S103).

The first weight calculating unit 201 performs the above-mentioned process on each pixel of the intermediate parallax image to calculate their respective first weights. As a result, the greater the first weight of a pixel, the further object the pixel indicates.

The target pixel setting unit 202 scans pixels in accordance with the operation order of raster scanning, thereby setting, as a target pixel, the pixel (pixel in the shade forming area) which corresponds to position vector c and at which occlude (c)=NOT-DONE. Although in the embodiment, the order of raster scanning is employed as the order of scanning an image, the order of, for example, Hilbert scanning, in which the entire image is scanned by a single stroke, may be employed instead of the order of the raster scanning. The position vector c corresponding to the target pixel is sent to the reference block setting unit 203.

The reference block setting unit 203 receives the first weight and the position vector c corresponding to the target pixel from the first weight calculating unit 201 and the target pixel setting unit 202, respectively. The reference block setting unit 203 sets an appropriate reference block near the target pixel.

The setting of the reference block will be described. Assume here that the reference block is a rectangular block of ($M_1 \times M_2$) pixels, $M_1$ and $M_2$ being predetermined.

Firstly, a base block using the target pixel as the center thereof is generated. The position vector c corresponding to the target pixel is used as an initial point, and a set of position vectors e corresponding to the pixels included in the base block is set as E. The set E can be expressed by each of the following mathematical expressions:

(1) If $M_1$ and $M_2$ are odd numbers, the set E is defined by the following mathematical expression:

$$E = \left\{ \begin{pmatrix} e_1 \\ e_2 \end{pmatrix} \middle| -\frac{(M_1+1)}{2} + \delta_1 \le e_1 \le \frac{(M_1+1)}{2} - \delta_1, \right.$$
$$\left. -\frac{(M_2+1)}{2} + \delta_2 \le e_2 \le \frac{(M_2+1)}{2} - \delta_2, e_1, e_2 \in Z \right\}$$

(2) If $M_1$ is an odd number and $M_2$ is an even number, the set E is defined by the following mathematical expression:

$$E = \left\{ \begin{pmatrix} e_1 \\ e_2+0.5 \end{pmatrix} \middle| -\frac{(M_1+1)}{2} + \delta_1 \le e_1 \le \frac{(M_1+1)}{2} - \delta_1, \right.$$
$$\left. -\frac{(M_2+1)}{2} + \delta_2 \le e_2 \le \frac{(M_2)}{2} - \delta_2, e_1, e_2 \in Z \right\}$$

(3) If $M_1$ is an even number and $M_2$ is an odd number the set E is defined by the following mathematical expression:

$$E = \left\{ \begin{pmatrix} e_1+0.5 \\ e_2 \end{pmatrix} \middle| -\frac{(M_1+1)}{2} + \delta_1 \le e_1 \le \frac{(M_1)}{2} - \delta_1, \right.$$
$$\left. -\frac{(M_2+1)}{2} + \delta_2 \le e_2 \le \frac{(M_2+1)}{2} - \delta_2, e_1, e_2 \in Z \right\}$$

(4) If $M_1$ and $M_2$ are even numbers, the set E is defined by the following mathematical expression:

$$E = \left\{ \begin{pmatrix} e_1+0.5 \\ e_2+0.5 \end{pmatrix} \middle| -\frac{(M_1+1)}{2} + \delta_1 \le e_1 \le \frac{(M_1)}{2} - \delta_1, \right.$$
$$\left. -\frac{(M_2+1)}{2} + \delta_2 \le e_2 \le \frac{(M_2)}{2} - \delta_2, e_1, e_2 \in Z \right\}$$

In each of the above mathematical expressions, Z is a set of all integers, and $\delta_1$ and $\delta_2$ are offset values for controlling candidates for the base block. $\delta_1$ and $\delta_2$ may be set to arbitrary numbers in accordance with the resolution of the input image or the allowable calculations. $\delta_1$ is a natural number including 0, and its maximum value is set to a minimum integer not less than $M_1/2$. Similarly, $\delta_2$ is a natural number including 0, and its maximum value is set to a minimum integer not less than $M_2/2$.

Figure 6:
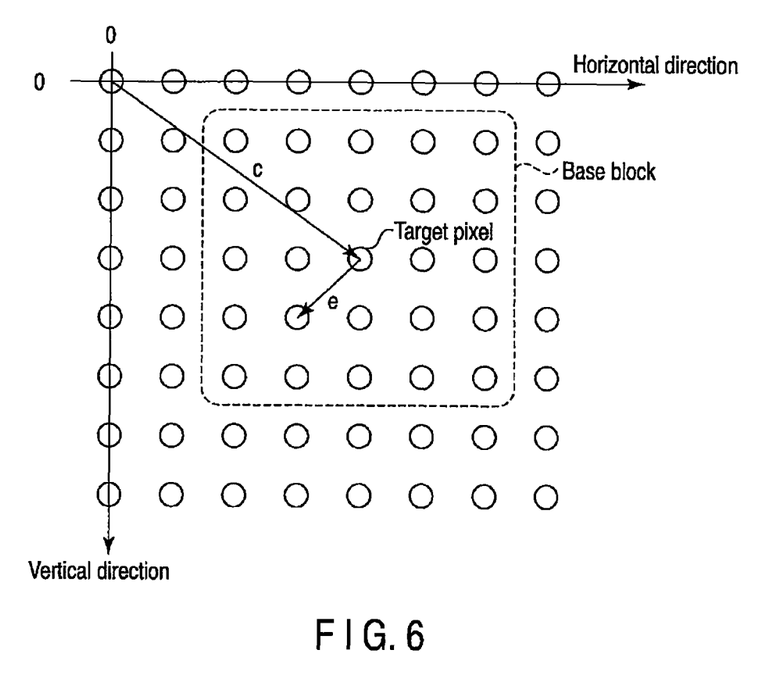
FIG. 6 is a view illustrating an example of a base block.

FIG. 6 shows an example of a base block set as described above. In the base block shown in FIG. 6, the position vector c corresponding to the target pixel is c=(4, 3), and $M_1=M_2=3$ and $\delta_1=\delta_2=0$. FIG. 6 further shows, as an example, position vector e=(-1, +1) stating from the target pixel c.

In the example of FIG. 6, since $M_1$ and $M_2$ are both odd number 3, the set E corresponds to a set of 25 vectors from the target pixel c to the respective pixels within the broken line. Further, if $\delta_1=\delta_2=1$, the set E is a set of vectors from the target pixel to the respective nine pixels within the broken line except for the outermost sixteen pixels. If one or both of $M_1$ and $M_2$ are an even number or even numbers, one or both of the components of each position are deviated by 0.5 from the integer values given by the above-mentioned mathematical expressions. Accordingly, in this case, each position vector in the set E does not indicate the center of a pixel, but does indicate the midpoint between a pair of adjacent pixels.

Subsequently, a candidate block for a reference block is set for each of the position vectors e within the base block. The central vector in the candidate block is one of the position vectors e starting from the target pixel c and included in the set E. Namely, the central vector in the candidate block is expressed by c+e. A set B (c+e) of position vectors b, which start from the point indicated by the position vector c+e and correspond to the pixels included in the candidate block of ($M_1 \times M_2$) pixels, is given by the following mathematical expression:

$$B(b) = \left\{ \begin{pmatrix} \alpha \\ \beta \end{pmatrix} \middle| -\frac{(M_1-1)}{2} \le \alpha \le \frac{(M_1-1)}{2}, \frac{(M_2-1)}{2} \le \beta \le \frac{(M_2-1)}{2}, \right\}$$

where α and β are integer values. If one or both of $M_1$ and $M_2$ are an even number or even numbers, one or both of the components of each position vector b are deviated by 0.5 from the integer values. Since, however, one or both of the components of the position vector c+e as the start point are also deviated by 0.5 from the integer values, each vector b in the set B indicates the center of the corresponding pixel.

Figure 7:
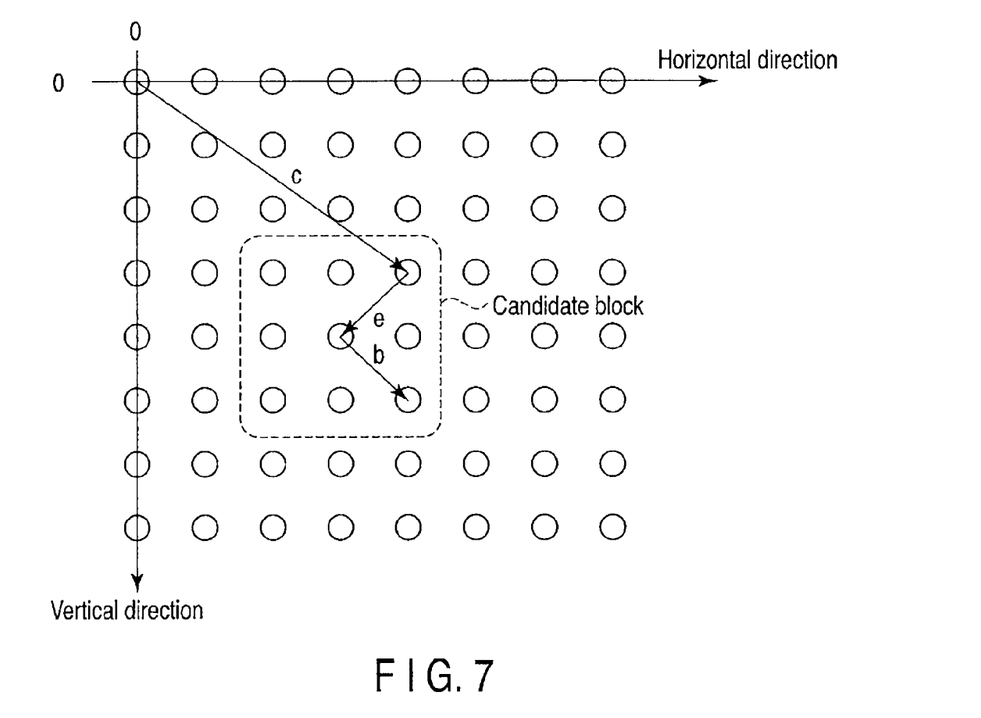
FIG. 7 is a view illustrating an example of a candidate block.

FIG. 7 shows an example of the candidate block set as described above. In the candidate block example of FIG. 7, the position vector c corresponding to the target pixel is c=(4, 3), the position vector c+e corresponding to the central pixel of the candidate block is c+e=(4, 3)+(−1, 1)=(3, 4), and $M_1=M_2=3$ and $\delta_1=\delta_2=0$. FIG. 7 further shows, as an example, position vector b=(1, 1) stating from the central pixel c+e.

As described above, a base block using the target pixel c as the center thereof is set in accordance with $\delta_1$ and $\delta_2$ designated by a user. In this case, a plurality of candidate blocks using respective pixels in the base block as their central pixels are obtained. The reference block setting unit 203 of the embodiment selects a reference block suitable for the present embodiment from the candidate blocks. More specifically, the position vector e, which maximizes the sum of the first weights of all pixels contained in the reference block, is selected. The position vector $e_m(c)$ starting from the target pixel c is given by the following equation:

$$e_m(c) = \underset{e \in E}{\operatorname{argmax}} \sum_{b \in B(c+e)} w1(c+e+b)$$

The reference block setting unit 203 calculates the position vector $e_m(c)$ starting from the target pixel c, using the above equation, and sets a reference block of an $(M_1 \times M_2)$ pixel size that uses, as the central pixel, the pixel indicated by the position vector $c+e_m(c)$. Since thus, the candidate block, in which the sum of the first weights of all pixels therein is largest, is used as the reference block, the reference block is a block that contains many pixels representing a distant view.

The target block searching unit 204 receives the first weights and reference block information from the first weight calculating unit 201 and the reference block setting unit 203, respectively, and also receives the shade-forming-area map and the intermediate parallax image. The target block searching unit 204 performs template matching associated with the reference block to detect a target block.

Target block searching will now be described. The target block searching unit 204 firstly sets a preset search area W in the intermediate parallax image, and sets a candidate target block of the same size as the reference block in the search area W. Assume here that the center position vector of the candidate target block is set to s, and that the candidate target block does not contain any pixels with no pixel values. A plurality of candidate target blocks may be set. Unless the searching area W includes a block that can serve as a candidate target block, it is enlarged.

The target block searching unit 204 searches the candidate target blocks, set in the search area W, for a target block that most matches the reference block set concerning the target pixel c, and selects it. For instance, the center vector s(c) of the target block is obtained by template matching based on a difference square sum standard, using the following equation:

$$s(c) = \underset{s \in W}{\operatorname{argmin}} \sum_{x \in B(c+e_m(c))} w1(c+e_m(c)+x)(I(c+e_m(c)+x) - I(s+x))^2$$

where I(i) is the pixel value of the pixel indicated by position vector i in the intermediate parallax image. As shown in this equation, the difference square sum is weighted by the first weight of the corresponding pixel when the template matching is performed.

Alternatively, the center vector s(c) may be obtained based on such an absolute difference value sum standard as given by the following equation:

$$s(c) = \underset{s \in W}{\operatorname{argmin}} \sum_{x \in B(c+e_m(c))} w1(c+e_m(c)+x)|I(c+e_m(c)+x) - I(s+x)|$$

Further, the search area W may be set not only in the intermediate parallax image, but also in an image displayed before or after a to-be-processed target image. Alternatively, the search area W may be set in an input image.

The pixel interpolating unit 205 receives, from the target block searching unit 204, the vector s(c) indicating the center position of the target block searched for the target pixel c, and also receives the intermediate parallax image. The pixel interpolating unit 205 substitutes the pixel value given by the following equation for the pixel value of the target pixel designated by the position vector c in the intermediate parallax image, based on the relative position of the target pixel and the searched target block:

$$I(c) = I(s(c) - e_m(c))$$

Namely, the pixel value of the pixel deviated by $e_m(c)$ from the central pixel of the target block in the intermediate parallax image is set as the pixel value of the target pixel c with no pixel value assigned thereto. Further, the pixel interpolating unit 205 changes the value of the shade-forming-area map corresponding to the pixel c to occlude (c)=DONE.

If the reference block includes, as well as the target pixel c, one or more pixels to which no pixel values are assigned, pixel values may be assigned thereto using a similar equation.

Assuming that the position vector corresponding to a pixel, other than the target pixel c, to which no pixel value is assigned, is c', the pixel interpolating unit 205 sets a pixel value for the pixel designated by the position vector c', using the following equation:

$$I(c+c') = I(s(c) - e_m(c) + c')$$

The pixel interpolating unit 205 changes the corresponding value of the shade-forming-area map to occlude (c+c')=DONE.

Figure 8:
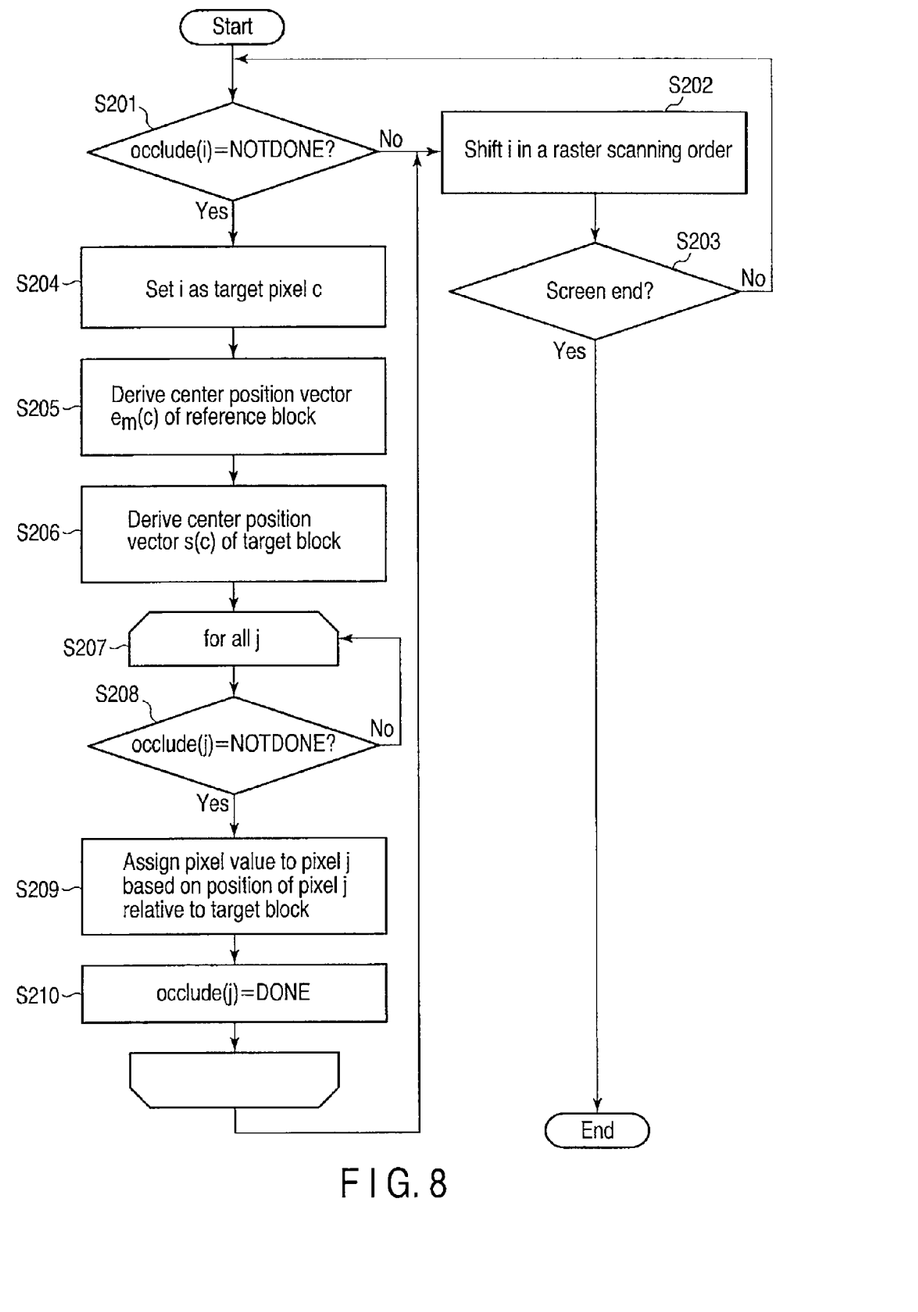
FIG. 8 is a flowchart useful in explaining a parallax image generating process performed by the pixel interpolation control unit.

Referring then to FIG. 8, the operation procedure of the pixel interpolation control unit 104 will be described. FIG. 8 is a flowchart useful in explaining the parallax image generating process performed in the pixel interpolation control unit 104. This process is performed mainly by the target pixel setting unit 202, the reference block setting unit 203, the target block searching unit 204 and the pixel interpolating unit 205 of the pixel interpolation control unit 104.

The target pixel setting unit 202 selects, as a processing target, the pixel designated by the position vector i in the intermediate parallax image. In the initial state, i is set to i=(0, 0).

The target pixel setting unit 202 determines whether the value of the shade-forming-area map corresponding to the pixel of the position i is set to occlude (i)=NOT-DONE (step S201). Namely, it is determined whether the pixel of the position i belongs to the shade forming area to which no pixel values are assigned.

If the value of the shade-forming-area map corresponding to the pixel of the position i is set to occlude (i)=DONE, i.e., if a pixel value is assigned to the pixel (NO at step S201), the target pixel setting unit 202 shifts the position vector i corresponding to the processing target pixel in accordance with the raster scanning order (step S202), and the program is returned to step S201. If the position vector i corresponding to the processing target pixel reaches the end of the screen (YES at step S203), the process is finished.

If the value of the shade-forming-area map corresponding to the pixel of the position i is set at occlude (i)=NOT-DONE, and no pixel values are assigned to the pixel (YES at step S201), the target pixel setting unit 202 sets the pixel of the position i as the target pixel c (step S204).

Subsequently, the reference block setting unit 203 sets a reference block for the target pixel c as described above (step S205). The reference block is set near the target pixel c so that the sum of the first weights of the pixels in the block is largest.

The target block searching unit 204 performs template matching on a candidate target block in the search area W for detecting whether this block matches the reference block, thereby deriving the center position vector s(c) of the target block (step S206).

Thereafter, the pixel interpolating unit 205 sets position vector j used to scan the reference block in the order of raster scanning (step S207). The pixel interpolating unit 205 determines whether the value of the shade-forming-area map corresponding to the pixel of the position vector j is set to occlude (j)=NOT-DONE (step S208).

If the value of the shade-forming-area map corresponding to the pixel indicated by the position vector j is set to occlude (j)=NOT-DONE (YES at step S208), the pixel interpolating unit 205 assigns a pixel value to the pixel corresponding to the position vector j, based on the position of the pixel relative to the target block (step S209). Further, the pixel interpolating unit 205 changes, to occlude (j)=DONE, the value of the shade-forming-area map corresponding to the pixel of the position vector j (step S210).

In contrast, if the value of the shade-forming-area map corresponding to the pixel of the position vector j is set to occlude (j)=DONE (NO at step S208), the pixel interpolating unit 205 shifts the position vector j in accordance with the order of raster scanning (step S207), thereby repeating the above-mentioned processing.

After the position vector j scans the entire reference block, the target pixel setting unit 202 shifts the position vector i corresponding to the processing target pixel in accordance with the order of raster scanning (S202).

If the shifted position vector i designates the terminal of the screen (YES at step S203), the processing is terminated. If the shifted position vector i does not designate the terminal of the screen (NO at step S203), the program returns to the step S201, thereby repeating the above-mentioned processing.

As described above, in the parallax image generating apparatus of the first embodiment, the first weight corresponding to the depth is set, and a reference block is generated in accordance with the first weight. Further, template matching utilizing the first weight is performed on the reference block, thereby assigning, to a shade forming area, the pixel values of pixels having a high correlation with background pixels. As a result, a more natural parallax image can be generated.

Other embodiments will now be described. In the following embodiments, elements similar to those in the first embodiment are denoted by the corresponding reference numbers, and no detailed description will be given thereof. Parallax image generating apparatuses according to the other embodiments have such structures as shown in FIG. 3.

(Second Embodiment)

In the first embodiment, in the template matching by the target block searching unit 204, matching is performed with the background-side pixels weighted, using the first weight obtained from the depth information. This enables pixel values more correlated to the background pixels to be assigned to the pixels belonging to the shade forming area. In the first embodiment, it is assumed that accurate depth information is input. Accordingly, if erroneous depth information is input, and a reference block includes pixels to which erroneous pixel values are assigned based on the erroneous depth information, the result of template matching will also include errors. Thus, pixel values highly correlated with the background pixels are not always assigned to the pixels of the shade forming area.

Figure 9:
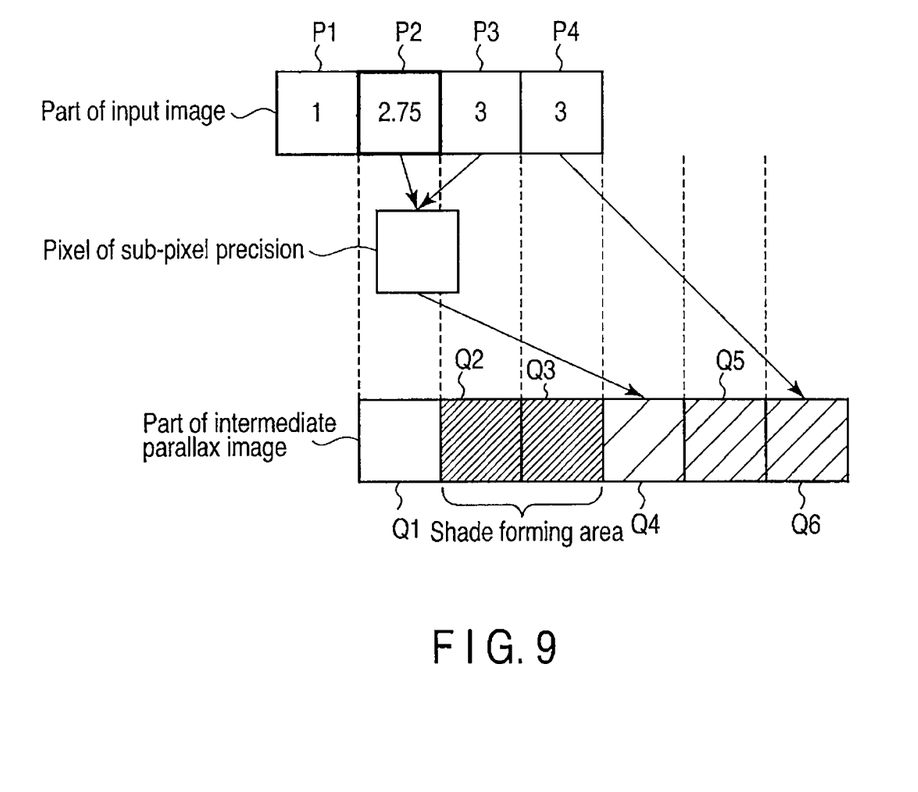
FIG. 9 is a view illustrating pixel value assignment performed when erroneous depth information is input.

FIG. 9 is a view useful in explaining how pixel assignment is performed when erroneous depth information is input. FIG. 9 shows four horizontally arranged pixels P1 to P4 as part of an input image. The numerical values in the respective pixels indicate the absolute values of the parallax vectors corresponding to the respective pixels and derived by the parallax vector deriving unit 101. In the example of FIG. 9, the absolute value of the parallax vector corresponding to pixel P1 is 1, that of the parallax vector corresponding to pixel P2 is 2.75, and those of the parallax vectors corresponding to pixels P3 and P4 are both 3. The pixels P1 and P2 belong to a foreground area, and the pixels P3 and P4 belong to a background area. In this example, however, the depth information is erroneous, and therefore the absolute value of the parallax vector corresponding to the pixel P2 is slightly greater than the actual one. This may well degrade the accuracy of measurement of the depth near the boundary between the foreground pixels and the background pixels.

The pixel assignment unit 102 shifts pixels corresponding to the parallax vectors having integer absolute values, by the distances corresponding to the absolute values, thereby generating an intermediate parallax image. In this intermediate parallax image, the pixel P1 corresponds to pixel Q1 shifted therefrom by one pixel, and the pixels P3 and P4 correspond to pixels Q5 and Q6 shifted therefrom by 3 pixels, respectively. If the absolute value of the parallax vector is a decimal number like the pixel P2, a pixel of sub-pixel precision is generated using, for example, bilinear method, and is assigned to the intermediate parallax image. In FIG. 9, the pixel P2 corresponds to pixel Q4 shifted by three pixels. As a result, in the intermediate parallax image, shade-forming-area pixels Q2 and Q3 are generated between the pixel Q1 corresponding to the pixel P1, and the pixel Q4 corresponding to the pixel P2.

When pixel interpolation is performed using the first weights, pixel values highly correlated with background pixels are assigned to pixels in the shade forming area. This may result in assignment of pixel values highly correlated with the background to the shade-forming-area pixels Q2 and Q3 between the pixels Q1 and Q4 corresponding to the foreground. To avoid this, in the second embodiment, a second weight for imparting a smaller weight to each pixel at the shade-forming-area boundary is introduced, and pixel interpolation is performed using a weight obtained by multiplying the first weight by the second weight.

A description will be given of pixel interpolation according to the second embodiment.

Figure 10:
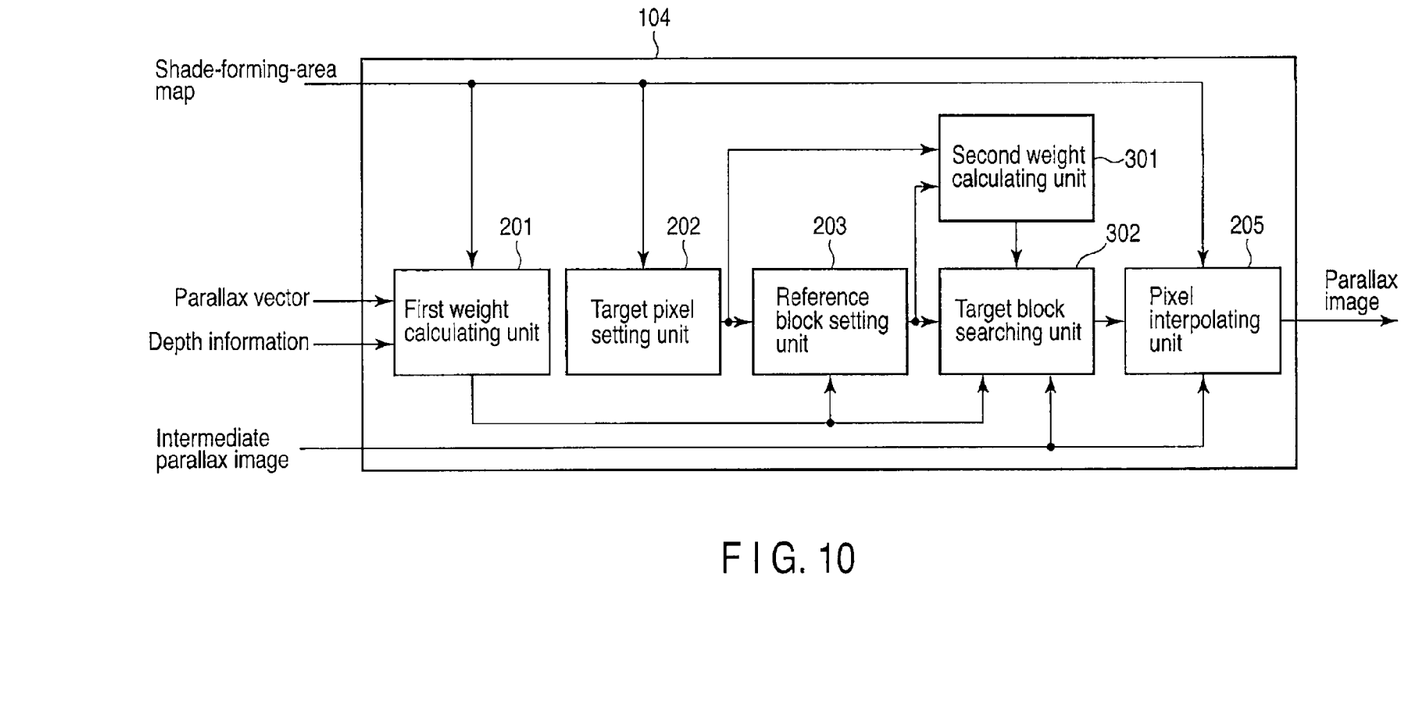
FIG. 10 is a block diagram illustrating, in detail, a pixel interpolation control unit employed in a second embodiment.

FIG. 10 is a schematic block diagram illustrating the configuration of a pixel interpolation control unit 104 incorporated in the second embodiment. As shown, the pixel interpolation control unit 104 of the second embodiment includes a first weight calculating unit 201, a target pixel setting unit 202, a reference block setting unit 203, a second weight calculating unit 301, a target block searching unit 204, and a pixel interpolating unit 205. The first weight calculating unit 201, the target pixel setting unit 202, the reference block setting unit 203, the target block searching unit 204, and the pixel interpolating unit 205 operate in the same ways as those in the first embodiment, and therefore will not be described.

The second weight calculating unit 301 receives a target pixel position vector c, and a reference block center position vector $e_m(c)$. Based on the received vectors, the second weight calculating unit 301 calculates a second weight w2 for each pixel in a reference block, and outputs the calculated weight to the target block searching unit 302.

A detailed description will be given of a method for calculating the second weight. Assume here that a position vector indicating the position of each pixel in the reference block is set to k. The position vector k satisfies the following mathematical expression:

$$k \in B(c+e_m(c))$$

In this case, the second weight corresponding to the pixel indicated by the position vector k is given by the following equation:

$$w2(k, e_m(c)) = \frac{1}{N}|e_m(c) + k|$$

where N is the size of the reference block and is given by the following equation:

$$N = \sum_{x \in B(c+e_m(c))} |e_m(c) + k|$$

Namely, the greater the distance between the pixel position k in the reference block and the target pixel position c, the greater the second weight w2.

As in the first embodiment, the target block searching unit 302 selects a block of the highest evaluation as a target block from the candidate target blocks set in the search area W, using the reference block set for the target pixel c, and a standard such as a difference square sum. The target block searching unit 302 of the second embodiment derives the center vector s(c) of the target block by template matching based on the difference square sum standard given by the following equation:

$$s(c) = \operatorname*{argmin}_{s \in W} \sum_{x \in B(c+e_m(c))} w1$$
$$(c + e_m(c) + x)w2(x, e_m(c))(I(c + e_m(c) + x) - I(s + x))^2$$

Namely, the target block searching unit 302 performs template matching that reflects the second weight w2 by multiplying the first weight w1 by the second weight w2.

Alternatively, the center vector s(c) may be obtained using the absolute difference value sum standard given by the following equation:

$$s(c) = $$
$$\operatorname*{argmin}_{s \in W} \sum_{x \in B(c+e_m(c))} w1(c + e_m(c) + x)w2(x, e_m(c))|I(c + e_m(c) + x) - I(s + x)|$$

The pixel interpolating unit 205 substitutes the pixel value, based on the position of the target pixel relative to the searched target block, for the pixel value of the target pixel designated by the position vector c, as in the first embodiment.

As described above, in the parallax image generating apparatus of the second embodiment, template matching is performed, using not only the first weight corresponding to the depth, but also the weight obtained by multiplying the first weight by the second weight for reducing the influence of pixels located at the boundary of the shade forming area. This enables pixel interpolation with an error in depth information reduced.

(Third Embodiment)

Figure 11:
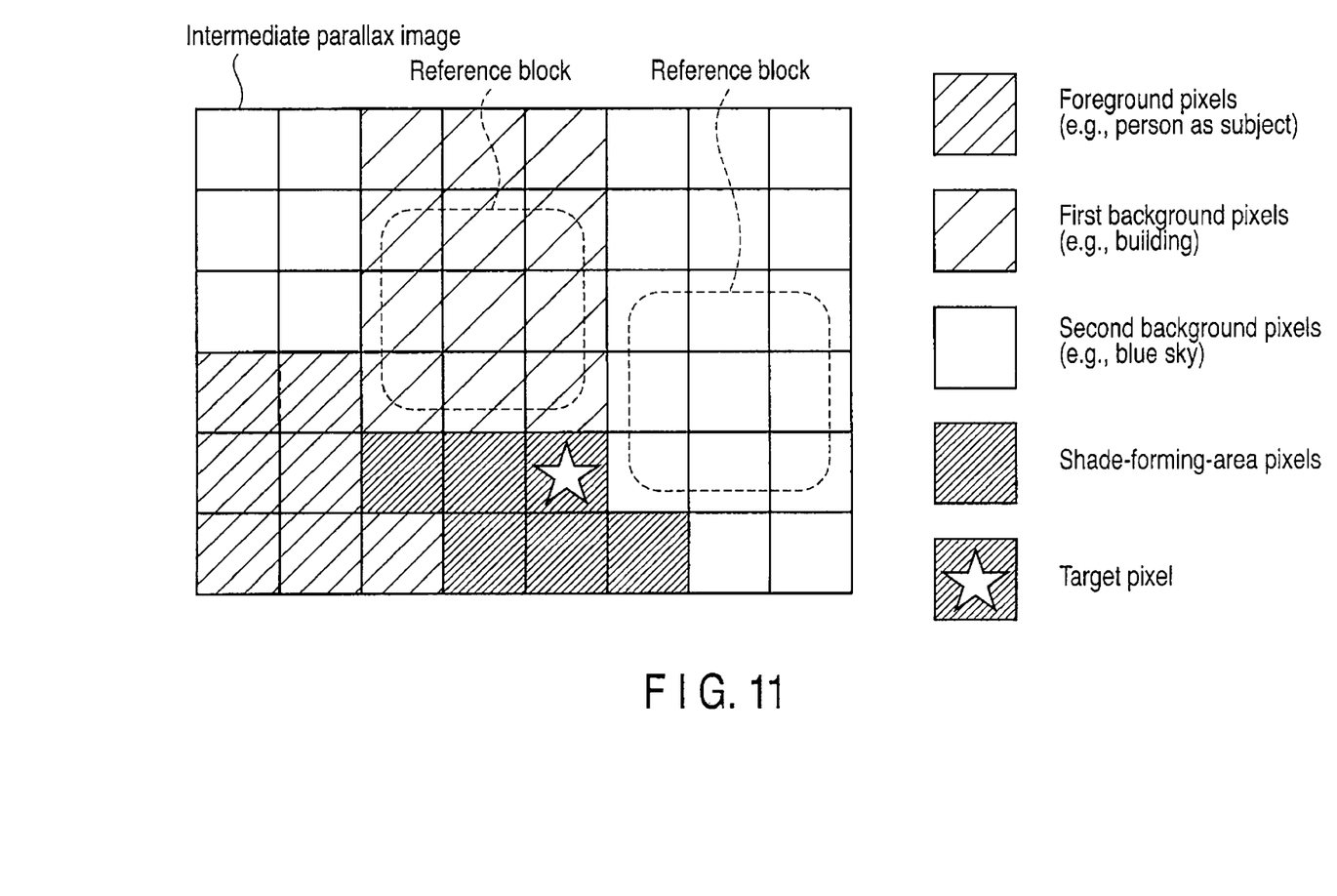
FIG. 11 is a view illustrating an example of an intermediate parallax image obtained when a screen includes a plurality of background areas.

In the first and second embodiments, the reference block setting unit 203 selects one reference block from a plurality of candidate blocks. However, such a case as shown in FIG. 11 exists, in which a plurality of background areas exist in one image (for example, a building (first background) and blue sky (second background) can exist as background areas behind a person as a subject). In this case, the pixel value to be interpolated significantly varies depending upon in which background area the reference block is set.

As a result, the correlation between pixels in a shade forming area may be reduced to thereby cause the interpolated pixel to be recognized as little noise. In view of this, in the third embodiment, a plurality of reference blocks are set, and template matching is performed in association with each reference block to detect a plurality of target blocks corresponding to the reference blocks, whereby the average of the pixel values of a plurality of pixels corresponding to the positions of the target pixel relative to the target blocks is assigned to the target pixel. As a result, variation in interpolated pixel value corresponding to the selected reference block is suppressed.

To simplify the following description, the number of the set reference blocks is assumed to be 2. However, the number of the set reference blocks is not limited to 2, but may be set to an integer not less than three but smaller than the number of base blocks that can be set.

The pixel interpolation process according to the third embodiment will be described.

Figure 12:
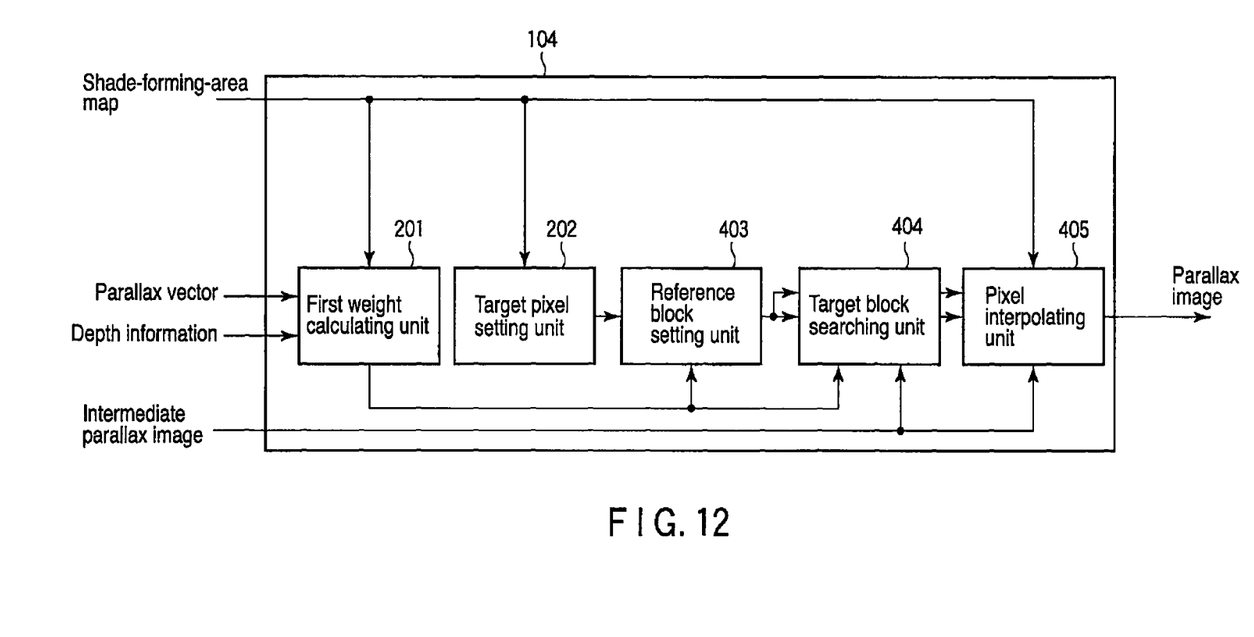
FIG. 12 is a block diagram illustrating, in detail, a pixel interpolation control unit employed in a third embodiment.

FIG. 12 is a block diagram illustrating in detail the configuration of a pixel interpolation control unit 104 employed in the third embodiment. The pixel interpolation control unit 104 of the third embodiment includes a first weight calculating unit 201, a target pixel setting unit 202, a reference block setting unit 403, a target block searching unit 404 and a pixel interpolating unit 405. Since the first weight calculating unit 201 and the target pixel setting unit 202 perform the same operations as the corresponding elements in the first embodiment, no descriptions will be given of them.

The reference block setting unit 403 selects a plurality of center vectors associated with the position vector c of the target pixel from a set E of position vectors e that indicate the center points of the reference blocks and start from the target pixel.

The reference block setting unit 403 obtains the sum T of the first weights assigned to the pixels in each of the reference blocks corresponding to the respective vectors e belonging to the set E, using the following equation:

$$T = \sum_{b \in B(c+e)} w1(c+e+b)$$

The reference block setting unit 403 detects a first position vector e1(c) that provides the highest value T1 of the calculated T values, and a second position vector e2(c) that provides the second highest value T2 of the calculated T values. The reference block setting unit 403 sets two reference blocks, i.e., a first reference block using the first position vector e1(c) as the center vector, and a second reference block using the first position vector e2(c) as the center vector. The reference block setting unit 403 outputs information concerning the first and second reference blocks to the target block searching unit 404.

With respect to the two position vectors e1 and e2, the target block searching unit 404 performs the same template matching as that of the target block searching unit 204 according to the first embodiment. As a result of the template matching, the first target block corresponding to the first position vector is obtained, and the position vector s1(c) indicating the center of the first target block is derived. Similarly, the second target block corresponding to the second position vector is obtained, and the position vector s2(c) indicating the center of the second target block is derived. The two position vectors s1(c) and s2(c) are output from the target block searching unit 404 to the pixel interpolating unit 405.

The pixel interpolating unit 405 averages the interpolated pixel values derived based on the position of the target pixel relative to that of each target block, thereby calculating the pixel value for interpolating the target pixel.

More specifically, upon receiving the first and second position vectors e1 and e2 corresponding to the target pixel c, and the position vectors s1(c) and s2(c) indicating the center points of the first and second target blocks, respectively, the pixel interpolating unit 405 calculates the pixel value for interpolating the target pixel, using the following equation:

$$I(c) = \lambda_1 I(s1(c) - e1(c)) + \lambda_2 I(s2(c) - e2(c))$$

where coefficients λ1 and λ2 are defined based on the sum of the first weights corresponding to the reference blocks, using the following equations:

$$\lambda_1 = \frac{T_1}{T_1 + T_2},$$

$$\lambda_2 = \frac{T_2}{T_1 + T_2}$$

Thus, the coefficient λ1 is determined in accordance with the ratio of T1 to the weight sum (T1+T2), and the coefficient λ2 is determined in accordance with the ratio of T2 to the weight sum. Alternatively, both the coefficients λ1 and λ2 may be set to 0.5.

Further, if some of the reference blocks contain one or more pixels with no pixel values, other than the target pixel c, the pixel interpolating unit 405 may assign pixel values to the respective pixels, like the pixel interpolating unit 205 of the first embodiment.

Assuming that the position vector in a reference block, which corresponds to the pixel with no pixel value other than the target pixel c, is set as position vector c', the pixel interpolating unit 405 sets the pixel value for the pixel designated by the position vector c', using the following equation:

$$I(c+c') = \lambda_1 I(s1(c) - e1(c) + c') + \lambda_2 I(s2(c) - e2(c) + c')$$

As described above, in the parallax image generating apparatus of the third embodiment, a plurality of reference blocks are set, and a plurality of target blocks are prepared by performing template matching with respect to the respective reference blocks. In a shade forming area, the average of a plurality of pixel values is assigned to the target pixel in accordance with the positions of the target pixel relative to the respective target blocks. This can suppress variation in interpolated pixel value due to reference block selection.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A parallax image generating apparatus comprising a CPU and a memory, the CPU configured to:
    receive an input image;
    derive a parallax vector corresponding to a first pixel of the input image from the input image and depth information associated with the first pixel;
    generate an intermediate image by assigning a pixel value of the first pixel to a pixel of a parallax image designated by the parallax vector;
    calculate first weights for respective pixels of the parallax image, such that the deeper a position of a second pixel of the input image indicated by the depth information, the greater a first weight for a pixel of the parallax image corresponding to the second pixel;
    set one or more candidate blocks near a shade-forming-area pixel of the intermediate image, to which pixel the generating unit assigns no pixels, then calculate sums obtained by multiplying, by respective first weights, pixel values of pixels included in the candidate block, and set a reference block among one or more candidate blocks in a decreasing order of the sums;
    search a target block similar to the reference block in the input image and/or the intermediate image;
    interpolate a pixel value of the shade-forming-area pixel based on a position of the shade-forming-area pixel relative to the target block; and
    obtain a parallax image having interpolated values.

2. The apparatus according to claim 1, wherein the CPU is further configured to calculate a second weight for each pixel of the reference block such that the further the each pixel of the reference block is from the shade-forming-area pixel, the greater a weight of the each pixel of the reference block,
    the searching the target block searches the target block using a product of the first and second weights of each pixel in each of blocks as candidate target blocks, thereby searching the target block.

3. The apparatus according to claim 1, wherein
    the setting the one or more candidate blocks sets a plurality of reference blocks near the shade-forming-area pixel;
    the searching the target block searches target blocks similar to respective reference blocks; and the interpolating the pixel value obtains interpolating pixel values for respective target blocks based on positions of the shade-forming-area pixel relative to the target blocks, and interpolates the pixel value of the shade-forming-area pixel using an average of the interpolating pixel values.

4. The apparatus according to claim 3, wherein the interpolating the pixel value calculates the average of the interpolating pixel values based on ratios in sums of the first weights in the respective reference blocks.

5. A parallax image generating apparatus comprising a CPU and a memory, the CPU configured to:
   receive an input image;
   derive a parallax vector corresponding to a first pixel of a to-be-processed frame, included in the input image having a plurality of frames, from the input image and depth information associated with the first pixel of the to-be-processed frame;
   generate an intermediate image by assigning a pixel value of the first pixel to a pixel of a parallax image designated by the parallax vector;
   calculate first weights for respective pixels of the parallax image, such that the deeper a position of a second pixel of the to-be-processed frame indicated by the depth information, the greater a first weight for a pixel of the parallax image corresponding to the second pixel;
   set one or more candidate blocks near a shade-forming-area pixel of the intermediate image, to which pixel the generating unit assigns no pixels, then calculate sums obtained by multiplying, by respective first weights, pixel values of pixels included in the at least one candidate block, and set a reference block among one or more candidate blocks in a decreasing order of the sums;
   search at least one of an image to be displayed temporally before or after the to-be-processed frame of the input image, an image corresponding to the to-be-processed frame, and the intermediate image, detect a target block similar to the reference block;
   interpolate a pixel value of the shade-forming-area pixel based on a position of the shade-forming-area pixel relative to the target block; and obtain a parallax image having interpolated values.

\* \* \* \* \*